(12) United States Patent
Goelz et al.

(10) Patent No.: US 8,922,967 B2
(45) Date of Patent: *Dec. 30, 2014

(54) THERMAL PROTECTION SYSTEM FOR ELECTRICAL DEVICE

(75) Inventors: Paul Goelz, Rochester Hills, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 177 days.

This patent is subject to a terminal disclaimer.

(21) Appl. No.: 13/365,495

(22) Filed: Feb. 3, 2012

(65) Prior Publication Data

US 2012/0206840 A1 Aug. 16, 2012

Related U.S. Application Data

(60) Provisional application No. 61/441,404, filed on Feb. 10, 2011.

(51) Int. Cl.
*H02H 9/00* (2006.01)
*H02H 5/04* (2006.01)
*H01R 13/66* (2006.01)

(52) U.S. Cl.
CPC ........... *H02H 5/043* (2013.01); *H01R 13/6683* (2013.01)
USPC ....................................................... 361/103

(58) Field of Classification Search
CPC ............ H02H 5/04–5/048; H02H 9/00; H01R 13/6683; H01R 13/7137; H03K 2017/0806
USPC ....................................................... 361/103
See application file for complete search history.

(56) References Cited

U.S. PATENT DOCUMENTS

| 5,590,010 | A | * | 12/1996 | Ceola et al. | ................... 361/93.4 |
| 5,600,306 | A | | 2/1997 | Ichikawa et al. | |
| 6,625,997 | B1 | | 9/2003 | Schultz | |
| 2001/0026826 | A1 | | 10/2001 | Tottenham et al. | |
| 2002/0019654 | A1 | | 2/2002 | Ellis et al. | |
| 2007/0091980 | A1 | | 4/2007 | Tanaka | |
| 2008/0012681 | A1 | | 1/2008 | Kadar et al. | |
| 2009/0085527 | A1 | * | 4/2009 | Odaohhara | ................... 320/150 |

(Continued)

FOREIGN PATENT DOCUMENTS

| CN | 101609971 A | 12/2009 |
| JP | 4079175 A | 3/1992 |
| JP | 9289062 A | 11/1997 |
| WO | 2010049775 A2 | 5/2010 |

OTHER PUBLICATIONS

Chinese Patent Office Action dated Jul. 2, 2014 in Chinese Appn. No. 201210029811.5, filed Feb. 10, 2012, 14 pgs.

*Primary Examiner* — Thienvu Tran
*Assistant Examiner* — Kevin J Comber
(74) *Attorney, Agent, or Firm* — Brooks Kushman P.C.

(57) ABSTRACT

A thermal protection system for an electrical system having a control system and an electrical outlet connected to an electrical power source includes an electrical cord having a plug attached thereto that is configured to electrically connect with the outlet. A non-contact temperature sensor is disposed within the plug and configured to measure a temperature of the outlet. The temperature sensor is in communication with the control system and configured to send a signal to the control system to effect a reduced flow of current through the outlet and plug when the temperature sensor indicates that a predetermined condition is met.

13 Claims, 1 Drawing Sheet

(56) References Cited

U.S. PATENT DOCUMENTS

| | | |
|---|---|---|
| 2009/0316321 A1 | 12/2009 | Ouwerkerk |
| 2010/0010684 A1* | 1/2010 | Lorenz et al. .................. 700/293 |
| 2010/0073829 A1* | 3/2010 | Baxter et al. ................... 361/42 |
| 2010/0277325 A1* | 11/2010 | Kopelman .................... 340/595 |

* cited by examiner

THERMAL PROTECTION SYSTEM FOR ELECTRICAL DEVICE

CROSS-REFERENCE TO RELATED APPLICATIONS

This application claims the benefit of U.S. provisional application No. 61/441,404 filed 10 Feb. 2011, which is hereby incorporated herein by reference.

TECHNICAL FIELD

The present invention relates to a thermal protection system for an electrical device or electrical system.

BACKGROUND

With the advent of electric and hybrid electric vehicles, vehicle operators are looking for convenient ways to charge their vehicles, and in particular, more places to charge their vehicles. This has led to the development of portable charge-cord sets that make it possible for the vehicle to be charged at various locations, but as a result, the vehicle operator may be using an electrical outlet of unknown quality. Because an electric vehicle may draw a relatively large amount of current—e.g., 13 amps (A) from a standard 120 volt (V) outlet—when it is charging, a poor quality outlet or circuit to which the outlet is connected, could lead to the outlet overheating.

In the case where an electrical outlet is overheating during a vehicle charging, the plug on the end of the charge-cord may or may not also reach an unacceptably high temperature. Even if some of the heat transfers from the outlet to the plug, the heat transfer will largely be conductive, and inefficient. Therefore, measuring the temperature of the cord, or even the plug on the end of the cord, will likely not provide a good indicator of the temperature of the outlet. Further complicating the issue is that a vehicle may be charged in a relatively cold ambient environment, such as in a garage. In such cases, the plug on the end of the charge-cord, may remain very cool throughout the charging process, while the electrical outlet becomes unacceptably hot. Therefore, a need exists for a thermal protection system for an electrical device, such as an electrical outlet, but which resides within the device over which the vehicle operator has control—e.g., a charge-cord set.

SUMMARY

At least some embodiments of the present invention include a thermal protection system for an electrical system having a control system and an electrical outlet connected to an electrical power source. An electrical cord has a plug attached thereto configured to electrically connect with the outlet. A non-contact temperature sensor is disposed within the plug and configured to measure a temperature of the outlet. The temperature sensor is in communication with the control system and configured to send a signal to the control system such that a flow of current through the outlet and plug is reduced when the temperature measured by the temperature sensor indicates that a predetermined condition is met.

In some embodiments, the predetermined condition may be a temperature being sensed to be above a predetermined temperature. In other embodiments, the predetermined condition may be a rate of temperature increase being above a predetermined rate. In still other embodiments, the predetermined condition may be met when the temperature of the outlet sensed by the temperature sensor is above an ambient temperature by a certain amount. The sensor may signal the control system to reduce the flow of current to zero through the outlet and the plug when the temperature sensed by the sensor indicates that the predetermined condition is met.

In at least some embodiments, the electrical cord is configured to connect with an electrical device such that the electrical device receives power from the power source when the plug is electrically connected to the outlet. The control system may reduce the flow of current to a non-zero predetermined current through the outlet and plug when the sensor's measurement indicates that the predetermined condition is met. The electrical device may be a vehicle charging system, and the non-zero predetermined current may be a minimum allowable current for the vehicle charging system. In other embodiments, the non-zero predetermined current may be a maximum current that will keep the predetermined condition from being met.

At least some embodiments of the present invention include a thermal protection system for an electrical system having an electrical outlet connected to an electrical power source. An electrical charge cord has a plug attached to a first end configured to electrically connect with the outlet and a second end configured to attach to a vehicle charging system. A non-contact temperature sensor is disposed within the plug and configured to measure a temperature of the outlet. A control system is in communication with the temperature sensor and configured to reduce a flow of current through the outlet and plug when the temperature sensed by the temperature sensor indicates that a predetermined condition is met.

At least some embodiments of the present invention include a thermal protection system for an electrical system having a control system and an electrical outlet connected to an electrical power source. An electrical charge cord has a plug attached to a first end configured to electrically connect with the outlet and a second end configured to attach to a vehicle charging system. A non-contact temperature sensor is disposed within the plug and is configured to measure a temperature of the outlet, and send a signal to the control system to effect a reduced flow of current through the outlet and plug when the temperature sensed by the sensor indicates that a predetermined condition is met.

In at least some embodiments, the temperature sensor is an infrared sensor that is configured to measure a temperature of the surface of the outlet. In such embodiments, the predetermined condition may be a temperature of the outlet surface being above a predetermined temperature. In other embodiments, the predetermined condition may be a rate of temperature increase of the outlet surface being above a predetermined rate of temperature increase. In still other embodiments, the predetermined condition may be met when the temperature of the outlet surface sensed by the temperature sensor is a certain amount above an ambient temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
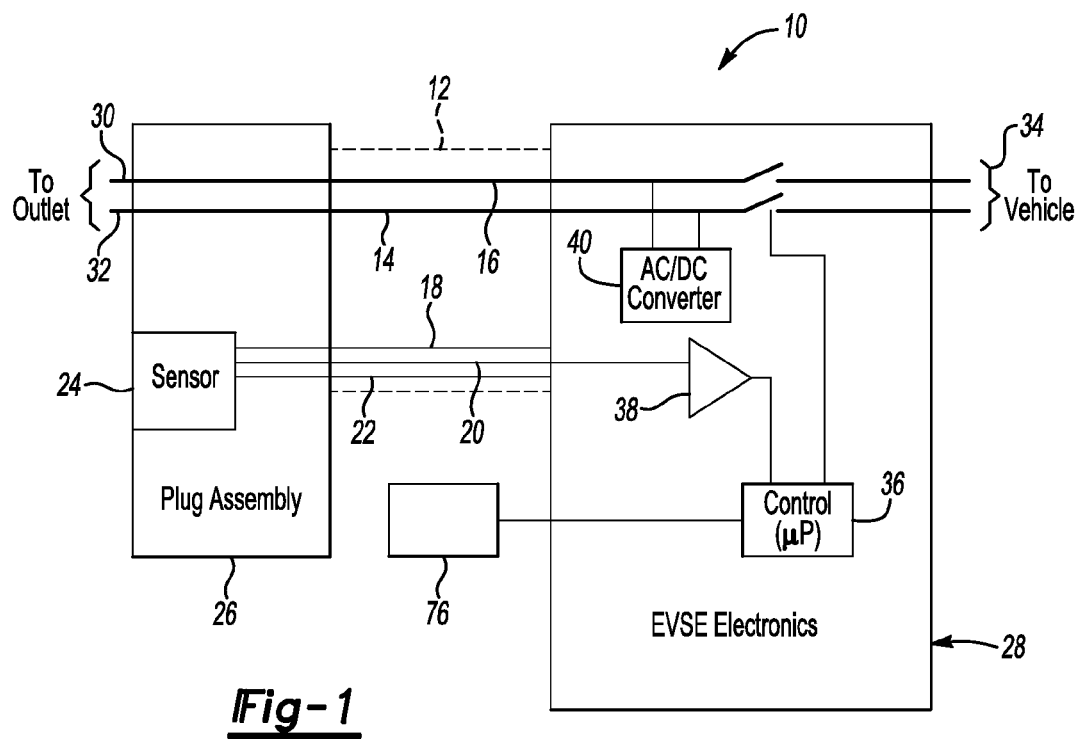
FIG. 1 shows a schematic drawing illustrating a thermal protection system in accordance with an embodiment of the present invention.

FIG. 1 shows a schematic representation of a thermal protection system 10 in accordance with an embodiment of the present invention. The thermal protection system 10 includes an electrical cord 12, the boundaries of which are shown by dashed lines. As explained in more detail below, the cord 12 includes electrical conductors 14, 16, as well as wires 18, 20, 22 connected to a sensor 24. The sensor 24 is a non-contact temperature sensor that is disposed within an electrical plug assembly 26. As explained and illustrated below in conjunction with FIG. 2, the sensor 24, although disposed within the plug assembly 26, is configured to measure a temperature of an electrical outlet to which the plug assembly 26 is connected.

Also shown in FIG. 1 is a schematic illustration of electric vehicle supply equipment (EVSE) 28. The EVSE 28 is part of an electrical charge-cord set that is used to facilitate charging of an electric or hybrid electric vehicle. Thus, in the embodiment shown in FIG. 1, the electrical cord 12 is an electrical charge-cord of the type that is used in conjunction with charging a vehicle. In this embodiment, one end of the cord 12 is attached to the plug assembly 26, which has prongs 30, 32 extending therefrom for electrical connection to an electrical outlet. The other end 34 of the cord 12 exits the EVSE 28 and is configured to attach to a vehicle charging system, which is typically on board the electric or hybrid electric vehicle.

The EVSE 28 also includes a control system 36 shown as a control microprocessor. An amplifier 38 amplifies the signal received from the sensor 24 prior to its entering the control system 36. As explained in more detail below, the control system 36 is configured to reduce the flow of current through the plug assembly 12 and any outlet to which it is attached upon the occurrence of a predetermined condition, which may be indicated by the temperature sensed by the sensor 24. In the illustrated embodiment, the EVSE 28 is configured with an AC/DC converter 40 which may be used to convert electrical power received from an outlet to a form that is usable by the vehicle, and in particular the vehicle battery.

Although the control system 36 is shown in this embodiment as part of the thermal protection system 10, other embodiments of the invention do not include an integrated control system, but rather, rely on a control system that resides, for example, on board the vehicle. In those embodiments, the signals output from a sensor, such as the sensor 24, must be in accordance with a protocol that is known to communicate with the onboard control system. Such a thermal protection system, for example, is shown in FIG. 2.

Figure 2:
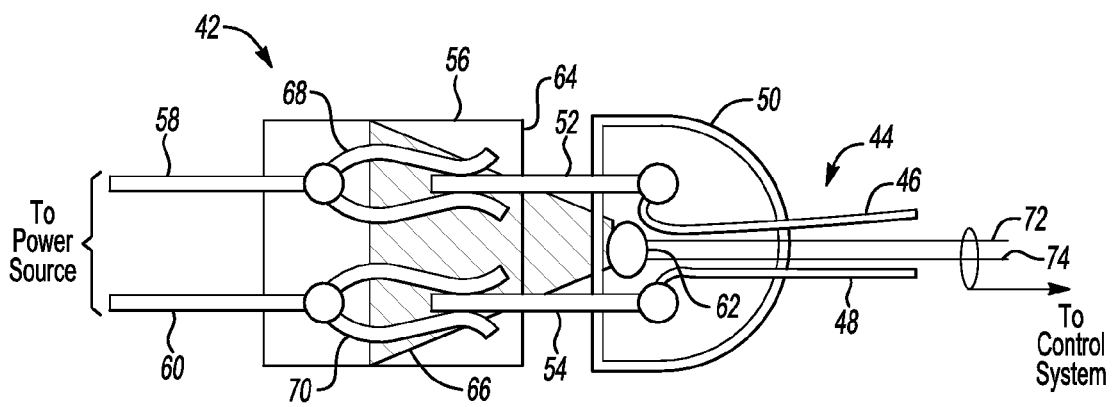
FIG. 2 shows a partially schematic drawing illustrating a thermal protection system in accordance with an embodiment of the present invention.

FIG. 2 shows a partially schematic illustration of a thermal protection system 42 in accordance with another embodiment of the present session. The thermal protection system 42 includes an electrical cord 44 having electrical conductors 46, 48, that are terminated in a plug 50. The plug 50 includes prongs 52, 54 configured for electrical connection to an electrical outlet 56. The outlet 56 is fed by conductors 58, 60 which may be, for example, attached to a circuit breaker panel or other electrical power source. Disposed within the plug 50 is a non-contact temperature sensor 62.

In the embodiment shown in FIG. 2, the temperature sensor 62 is an infrared sensor that is configured to measure a temperature of the outlet 56. In particular, the sensor 62 is configured to measure a temperature of a surface 64 of the outlet 56. Also shown in FIG. 2 is a schematic representation of a field of view 66 of the sensor 62. Although the field of view 66 is shown as extending deep into the outlet 56, it is illustrated in this fashion merely to show the general pattern of what a sensor, such as the infrared sensor 62, detects.

Specifically, the sensor 62 is chosen and disposed within the plug 50 in such a fashion that the generally cone-shaped field of view covers the electrical terminals 68, 70 of the outlet 56. In many cases, an outlet, such as the outlet 56, will have three electrical terminals, a neutral, a hot and a ground. In that case, a sensor, such as the sensor 62 will be positioned and configured to have a field of view that approximately covers the openings in the outlet of all three terminals.

Also shown in FIG. 2, the sensor 62 includes conductors 72, 74 configured to communicate signals from the sensor 62 to a control system, for example, the control system 36 shown in FIG. 1, or a control system on board a vehicle. Although the sensor 24 shown in FIG. 1, includes three conductors 18, 20, 22, with only the conductor 22 being shown communicating with the control system 36, the particular configuration of a non-contact sensor may differ in different embodiments, depending on a number of factors, including the specific sensor being used, and the control system with which it is communicating.

In both of the embodiments shown in FIGS. 1 and 2, however, the thermal protection systems 10, 42 are configured to protect an electrical system, which may include an electrical outlet, such as the outlet 56, and a control system such as a control system disposed on board an electric or hybrid electric vehicle. Indeed, when a thermal protection system, such as the system 10 or the system 42, is disposed between an electrical outlet and, for example, an electric vehicle, the thermal protection system itself may become part of the electrical system it is protecting.

One of the ways in which a thermal protection system, such as the system 10 or the system 42, provides protection, is by reducing a flow of current through the electrical system when a predetermined condition is met. In some embodiments, the predetermined condition may be met when a sensor, such as the sensor 62, senses a temperature of the outlet 56 being above a predetermined temperature. As described above, such a determination can be very important in situations where an electric charge-cord set is being used on various electrical outlets of unknown quality. For example, an outlet, such as the outlet 56 may experience heating that is generally described by an equation that includes the square of the current flowing through the outlet. Thus, relatively small reductions in current flow can significantly reduce the heat being generated.

In some cases, it may be necessary or desirable to reduce the flow of current to zero—i.e., open the circuit or otherwise completely cut off all current flow. This is the example illustrated in FIG. 1, in which the control system 36 is shown as disconnecting the electrical conductors 14, 16 in the EVSE 28. The control system 36 may be configured to perform this task whenever the sensor 24 provides a signal indicating a sensed temperature above a predetermined temperature. In some embodiments, the predetermined temperature may be in the range of 80-90 C. Conversely, a rate of temperature increase may be used as the predetermined condition, so that a single temperature reading, which could be transient, does not cause the circuit to be disconnected unnecessarily. For example, a rate of temperature increase of 10 C in 1-3 minutes may be preprogrammed into a control system, such as the control system 36, and used as the predetermined condition that causes the circuit to be disconnected. Thus, if the sensor 24 signals the control system 36 that the measured temperature is 40 C, and then less than one minute later signals the control system that the measure temperature is 55 C, the sensor 24 has indicated that the predetermined condition is met.

Another predetermined condition that can be used is a rise in the measured temperature to a certain temperature above a temperature of the ambient environment surrounding the plug and outlet. For example, FIG. 1 shows a second temperature sensor 76 configured to measure a temperature of the ambient environment. The sensor 76 communicates with the control system 36, providing the ambient temperature for the control system 36 to use in a determination of whether the predetermined condition is met. In one embodiment, the predetermined condition may be met when the temperature of an outlet as measured by the sensor 24 is 70 C or more above the ambient temperature. Thus, when the sensor 24 measures a temperature of an outlet to be 60 C, and the sensor 76 measures an ambient temperature of 50 C, the difference is only 10 C and temperature sensed by the sensor 24 indicates that the predetermined condition is not met. Conversely, the same temperature reading by the sensor 24—i.e., 60 C—may indicate a problem if the ambient temperature is −10 C; in this case, the measurement of the sensor 24 indicates that the predetermined condition is met and the control system 36 will take action to reduce the temperature of the outlet, for example, by cutting current flow through the system.

In the examples described above, the current flow was reduced to zero when the predetermined condition was met. This does not need to be the case, however, and embodiments of the present invention contemplate a different control upon occurrence of the predetermined condition. Specifically, embodiments of the invention contemplate a reduction in current flow to some non-zero level when the predetermined condition is met. For example, in the case that a thermal protection system, such as the system 10 or 42, is used in charging an electric or hybrid electric vehicle, the control system may be configured to reduce the flow of current to the minimum allowable current for the vehicle charging system. For some electric and hybrid electric vehicles today, that level may be approximately 6 A.

In other embodiments, the current may be reduced to some maximum level of current that will keep the predetermined condition from being met. For example, if a sensor, such as the sensor 62, detects a temperature of the outlet 56 being above the predetermined temperature, its signal may cause a control system to reduce the current flow by the minimum amount necessary (thereby maintaining the maximum allowable current flow) that allows the temperature of the outlet 56 to decrease just below the predetermined temperature. In the case of vehicle charging, this may be accomplished, for example, by controlling the onboard charging system to maintain a slightly less aggressive charging routine.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A thermal protection system for an electrical system having a control system and an electrical outlet connected to an electrical power source, the thermal protection system comprising:
    an electrical cord having a plug attached thereto configured to electrically connect with the outlet; and
    a non-contact, infrared temperature sensor disposed within the plug and configured to measure a temperature of the outlet, the temperature sensor being in communication with the control system and configured to send a signal to the control system such that a flow of current through the outlet and plug is reduced when the temperature measured by the temperature sensor indicates that a predetermined condition is met, and
    wherein the electrical cord is configured to connect with an electrical device such that the electrical device receives power from the power source when the plug is electrically connected to the outlet, the sensor signaling the control system to reduce the flow of current to a non-zero predetermined current through the outlet and plug when the sensor indicates that the predetermined condition is met.

2. The thermal protection system of claim 1, wherein the predetermined condition is one of a temperature of the outlet being above a predetermined temperature or a rate of temperature increase of a temperature of the outlet being above a predetermined rate.

3. The thermal protection system of claim 1, wherein the predetermined condition is a temperature of the outlet being a predetermined amount above a current temperature of an ambient environment.

4. The thermal protection system of claim 1, wherein the sensor signals the control system to reduce the flow of current to zero through the outlet and plug when the sensor indicates that the predetermined condition is met.

5. The thermal protection system of claim 1, wherein the electrical device is a vehicle charging system and the non-zero predetermined current is a minimum allowable current for the vehicle charging system.

6. The thermal protection system of claim 1, wherein the non-zero predetermined current is a maximum current that will keep the predetermined condition from being met.

7. The thermal protection system of claim 1, wherein the sensor is an infrared sensor configured to measure a temperature of a surface of the outlet.

8. A thermal protection system for an electrical system having an electrical outlet connected to an electrical power source, the thermal protection system comprising:
    an electrical charge cord having a plug attached to a first end configured to electrically connect with the outlet and a second end configured to attach to a vehicle charging system;
    a non-contact, infrared temperature sensor disposed within the plug and configured to measure a temperature of a surface of the outlet; and
    a control system in communication with the temperature sensor and configured to reduce a flow of current through the outlet and plug when the temperature measured by the temperature sensor indicates that a predetermined condition is met, and
    wherein the control system is configured to reduce the flow of current to a non-zero predetermined current through the outlet and plug when the sensor indicates that the predetermined condition is met.

9. The thermal protection system of claim 8, wherein the predetermined condition is a temperature of the outlet surface being above a predetermined temperature.

10. A thermal protection system for an electrical system having an electrical outlet connected to an electrical power source, the thermal protection system comprising:

an electrical charge cord having a plug attached to a first end configured to electrically connect with the outlet and a second end configured to attach to a vehicle charging system;

a non-contact, infrared temperature sensor disposed within the plug and configured to measure a temperature of a surface of the outlet; and a control system in communication with the temperature sensor and configured to reduce a flow of current through the outlet and plug when the temperature measured by the temperature sensor indicates that a predetermined condition is met, and wherein the predetermined condition is a rate of temperature increase of the outlet surface being above a predetermined rate.

11. The thermal protection system of claim 8, wherein the control system is configured to reduce the flow of current to zero through the outlet and plug when the sensor indicates that the predetermined condition is met.

12. The thermal protection system of claim 8, wherein the non-zero predetermined current is a minimum allowable current for the vehicle charging system.

13. The thermal protection system of claim 8, wherein the non-zero predetermined current is a maximum current that will keep the predetermined condition from being met.

* * * * *